Fig. 2a.

Nov. 8, 1955 C. DRIGENKO ET AL 2,723,030
CLASSIFYING APPARATUS FOR SAND COMMONLY CALLED SAND CONES
Filed Aug. 28, 1951

Fig.2b.

Inventors:
Constantine Drigenko and
John Degory Baron Phipps
By Baldwin & Wight
attorneys

United States Patent Office 2,723,030
Patented Nov. 8, 1955

2,723,030

CLASSIFYING APPARATUS FOR SAND COMMONLY CALLED SAND CONES

Constantine Drigenko, St. Margarets-on-Thames, and John Degory Baron Phipps, London, England, said Phipps assignor to Floatex Separations Limited, London, England, a British company Application August 28, 1951, Serial No. 244,022

Claims priority, application Great Britain September 5, 1950

10 Claims. (Cl. 209—160)

The invention relates to sand cones of the kind in which a discharge valve at the bottom of the cone for the coarser fraction is adjusted as to its degree of opening in response to the pressure of the suspension of sand in water at the inlet, the pressure at the inlet itself varying in accordance with the level of the deposited sand in the cone, which chokes the flow of suspension to a varying degree. Such a cone is described in British patent specification No. 634,226 (U. S. Patent 2,564,963).

Cones of the kind referred to are intended mainly for moderate outputs, up to say 40 tons per hour of ordinary sands, but the mechanism for regulating the degree of opening of the valve would become too weak in operation and too sluggish with a cone built to deal with large quantities such as 100 tons of sand per hour and upwards. Moreover, when dealing with very fine sand almost like quicksand, it becomes increasingly difficult to build up sufficient pressure at the inlet to operate the discharge valve, even when the input of sand is less than 1 ton per hour.

For cases of the kind referred to above it is necessary to provide much more delicate mechanism which will operate more quickly. The problem envisaged by the present invention in regard to fine sand may be illustrated by the statement that for moderate outputs, up to 40 tons per hour of ordinary sands, the excess pressure at the inlet available for operating the valve may be equivalent to a head of 4 to 8 inches of water (10 to 20 cm.), whereas under otherwise similar conditions very fine sands will only build up a pressure of 1 to 2 inches of water (2.5 to 5 cm.).

In some cases the sand input is subject to sudden fluctuations, for instance when used in conjunction with a dredging plant. For a case of this kind the mechanism previously disclosed is neither powerful enough nor sufficiently sensitive to deal with rapid fluctuations, particularly the sudden cessation of sand load. The present invention is directed to a form of regulating device which is both sensitive in operation and powerful in regard to the force exerted on the valve. The device of the invention will operate with very small changes in the effective head of water at the inlet and it can nevertheless provide a very powerful, and rapid closing of the valve which will prevent "gushing," i. e. the rapid discharge of the whole accumulated sand bed before the valve has had time to close.

According to the invention the device comprises a tank movable up and down to actuate the discharge valve and having a metering orifice in its base, means for supplying the tank with liquid at a rate dependent on the pressure at the inlet of the cone, and a stationary restrictor projecting into the metering orifice and tapered to permit an outflow of liquid increasing and decreasing as the tank takes up a progressively lower and higher position respectively. The device may in some cases be coupled direct to the valve by lever or like gear, but in many cases such an arrangement will not provide sufficient power for closing the valve against a heavy discharge. In the preferred form of construction the device acts on a hydraulic amplifier or relay by which the force applied to the valve is amplified.

According to a further feature of the invention the amplifier comprises a balance lever upon which the valve is suspended, a balance weight being provided to provide sufficient static closing force. The lever also carries at each end a tank or canister into which equal proportions of the overflow from the cone are directed, while each tank or canister has a metering orifice at its base in which a restrictor operates, the restrictors being suspended on a lever actuated by the device referred to above.

It will be seen that if the device referred to, which we prefer to call a pre-amplifier, causes the beam to move in one direction, the outflow of liquid from one of the canisters is increased and that from the other is decreased, causing an immediate change in opposite directions of liquid levels in the two tanks. The difference thus produced in the weight of liquid in the canisters moves the lever, and with it the discharge valve, until the canisters are brought into a position in which their discharges are again equal. Thus the main amplifier or relay very rapidly follows the movements of the pre-amplifier, and at the same time, due to the size of the canisters and the quantity of water they contain, an extremely heavy closing force is exerted on the valve, but there is no reaction on the restrictors which would tend to move the pre-amplifier.

The invention is illustrated in the accompanying drawings, in which.

Figure 1:
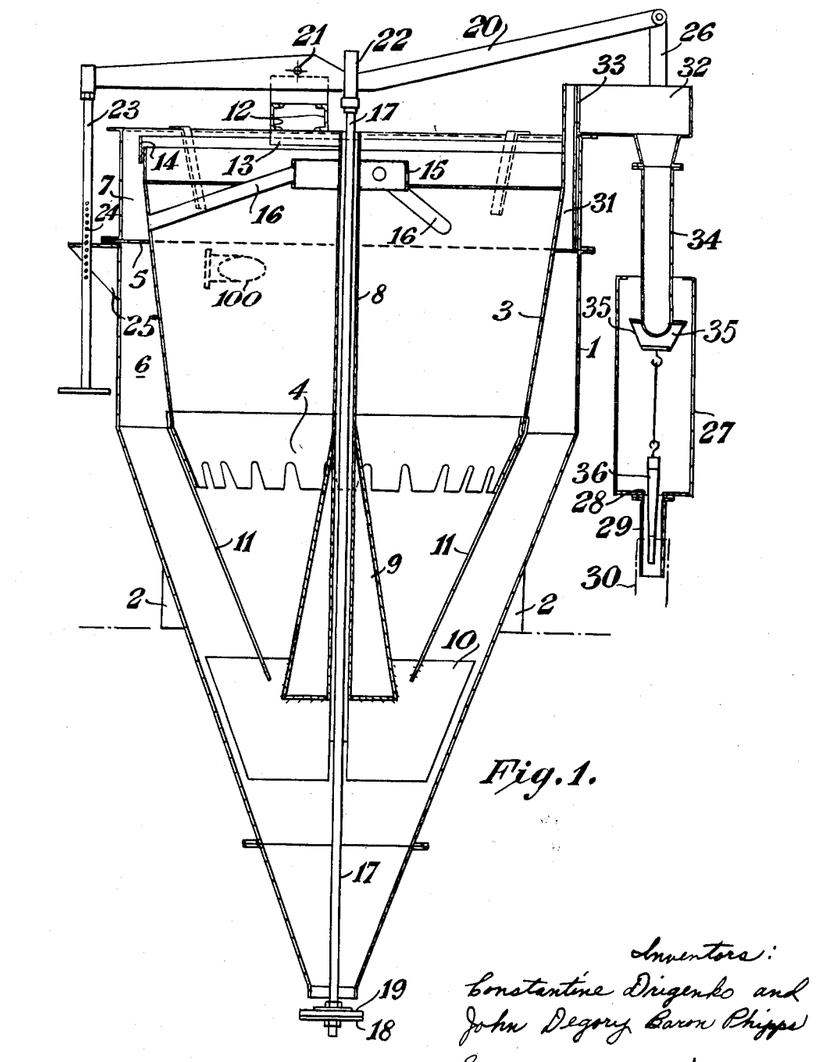
Figure 1 is an elevation of a small cone according to the invention taken in section on the centre line, Figures 2a and 2b together constitute a similar view of a larger cone with part broken away.

Referring first to Figure 1, the cone has an outer shell 1 made up of an inverted conical portion surmounted by a cylindrical portion, fixing brackets 2 being provided towards the upper end of the conical portion. Inside the outer shell 1 there is a skirt member or inner shell 3 tapering slightly inwards towards the bottom and carrying at its lower edge a short portion 4 of greater degree of taper terminating in tapering teeth. The inner shell 3 is attached to the outer shell 1 by a horizontal annular partition 5 towards the upper end, by which a closed inlet chamber 6 is formed outside the inner shell and below the partition, and an overflow channel 7 above the partition. A tangential inlet 100 supplies the incoming suspension of sand and water.

A central tube 8 extends vertically from the top of the cone well into the conical portion and supports at its lower part a fairly acute upright conical member 9, the function of which is to prevent the formation of any vortex at the lower part of the cone. At its lower part the member 9 is provided with vanes 10 extending in diametral planes almost to the wall of the outer shell. Straps 11 secure the vanes 10 to the inner shell 3. These vanes 10 also assist in suppressing any vortex action at the discharge. To locate the top of the tube 8 and for another purpose to be disclosed later a bridge member 12 composed of two channel irons on edge is fixed across the outer shell a little away from the centre. A bracket 13 bolted centrally to the under side of the member 12 embraces the tube 8.

Overflow from the top of the inner shell takes place peripherally over an edge 14 adjustable as to height and is discharged from the channel 7. To assist the discharge a ring 15 unites the ends of three radial pipes 16 open at both ends. Thereby additional liquid is discharged from near the centre to the channel 7. This secondary overflow appreciably reduces the quantity of fine sand escaping to waste, because the rotary movement of the suspension due to the tangential inlet causes the liquid near the centre of the cone to carry a smaller proportion of solids in suspension than that nearer the periphery.

A valve rod 17 is suspended centrally in the tube 8. At its lower end a valve disc 18 is fixed and carries a rubber plate 19. An upward pull on the rod 17 pulls the disc 18 with its rubber plate 19 against the lower end of the outer shell 1, thereby constituting a valve for the sand. The opening of the valve varies according to the distance by which the valve rod 17 and valve member 18, 19 move downwards from the closed position.

A lever 20 is mounted in ball bearings 21 supported at the centre of the bridge member 12. The lever 20 is more or less horizontal and supports the valve rod 17 by a knife edge in a housing 22. The left hand end of the lever 20 is extended beyond the outer shell 1 to carry a rod 23, on which counterweights are placed to balance the weight of the valve rod 17 and attached parts, the downward force on the valve due to the pressure of sand and water in the cone and the weight of operating gear to be described later. Holes 24 in the rod 23 are adapted to receive a stop pin, which by abutting against a bracket 25 limit the closing movement of the valve and thereby obviate damage to the rubber 19.

The lever 20 is extended at its right hand end to carry the moving parts of what we call the pre-amplifier. Actually the lever consists of two similar parts bolted together with distance pieces between them, and at the right hand end the two parts are splayed apart. Links 26, of which only the rear one appears in Figure 1, are pivoted on the end of the lever 20 and carry a cylindrical tank 27 having a wide opening at the top and a precisely dimensioned metering orifice 28 at the bottom. An extension tube 29 surrounds the metering orifice 28 and serves to guide liquid discharged therethrough into a waste pipe 30. It is preferable to make the lever 20 a little different from the drawing in that the fulcrum 21 and the suspension points of the parts 23, 17 and 26 are in one straight line, which is horizontal in the mean position of the lever.

At a point adjacent to the tank 27 the channel 7 is interrupted by a connecting duct 31 between the inlet chamber 6 and a bleeding tank 32 mounted on the side of the cone. Liquid from the duct 31 enters the bleeding tank 32 through a weir plate 33 by which the flow into the tank 32 is made proportional to the head of water in the duct 31 measured from the overflow edge 14. This is achieved by providing the weir plate with an aperture in which the width at any height varies inversely as the square root of the height measured from the lower edge of the aperture. Liquid entering the tank 32 is discharged down a pipe 34 and by two opposite horizontal outlets 35 into the inside of the tank 27, whereby the discharge produces no reaction on the tank 27.

A restrictor 36 is suspended on the lower end of the pipe 34 to swing freely in the metering orifice 28. The restrictor is tapered as shown. It is not truly conical at its middle part, but is tapered to provide an area of discharge which will make the relation between the head of water in the tank 27 above the orifice 28 and the rise or fall of the tank 27 a linear one.

It will be seen that the result of an increased accumulation of sand in the cone is a rise of the liquid level in the connecting duct 31 and an increased quantity of liquid flowing over the weir 33 and into the pre-amplifier tank 27. The level of liquid in the latter rises, the weight increases, and the discharge valve 18, 19 of the cone is opened to an increased extent. At the same time the downward movement of the pre-amplifier tank 27 provides an increased area of discharge for the liquid through the orifice 28, so that the liquid level in the tank 27 will fall until a new equilibrium position is reached and the cone discharge valve 18, 19 has been adjusted to suit the new conditions. The action is similar but in the reverse direction when the accumulation of sand in the cone diminishes.

Various forms of hydraulic amplifier can be used in conjunction with the pre-amplifier described, and a description of one form of cone in accordance with the invention will now be given in which the pre-amplifier alone would not be sufficiently powerful. This is shown in Figures 2 to 7.

The cone itself is of generally similar form to that just described, including the outer shell 1, inner shell 3, toothed ring 4, annular partition 5, central tube 8 and conical member 9. The lower part is cut away in Figures 2 and 3 but must be understood to include a valve 18, 19 as shown in Figure 1 suspended on a valve rod 17. As before an overflow ring 14 of adjustable height provides for discharge of waste to the space 7, and in this case also there is additionally an inner overflow 37 communicating by pipes 38 with a gutter tank 39, which also receives the discharge from the space 7. The gutter tank 39 is mounted on the side of the outer shell 1 for operating a hydraulic amplifier as will be described later.

Figure 5:
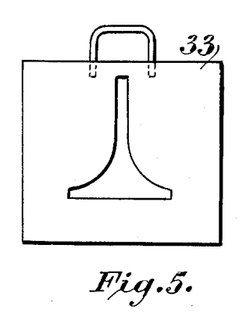
Figure 5 is an elevation of a weir plate.
Figure 6:
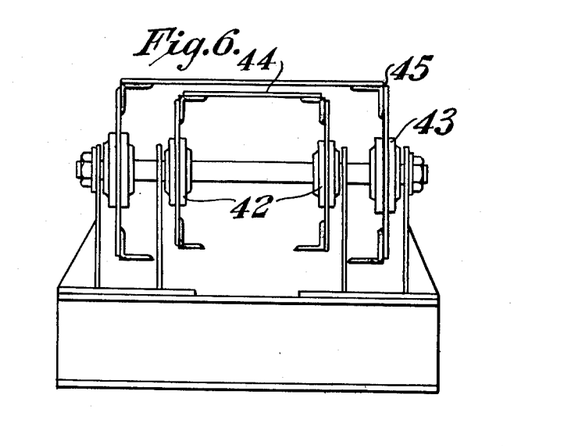
Figure 6 is a section of the levers taken on the line VI—VI of Figure 2.

There is also a duct or passage 31 from the pressure chamber 6 to a weir tank 40, in which the liquid level depends on the resistance to flow imposed by the sand partly covering the teeth 4. A weir plate 33 is shaped preferably to give a discharge from the tank 40 proportional to the head of liquid in the tank above the overflow edge 14. The weir plate is made removable, so that different plates can be used according to the effect desired. One form of weir plate is shown in Figure 5.

The liquid passing through the weir plate 33 is discharged by a pipe 34 into the pre-amplifier tank 27 suspended by a pair of slings 26 from the end of a lever to be described later. The pre-amplifier tank has as before a metering orifice 28 and a discharge pipe 29 leading to a waste pipe 30. A restrictor 36 is suspended by a link from the discharge side of the weir tank 40 to cooperate with the metering orifice 28 as previously described.

A channel beam structure 41 spans the cone at the top to form a support for the weir tank 40 and for other parts yet to be described. A little off centre the structure 41 is built up to carry four ball bearings 42, 43 in which are pivoted an inner double lever 44 and an outer double lever 45 respectively. The pivots of the levers are coaxial, and the arrangement of one within the other can be seen from Figures 6 and 7. It is the inner lever 44 which carries the slings 26 supporting the pre-amplifier tank 27. At the other end this lever carries a counterweight 46. The outer lever 45 carries the valve rod 17 by means of ball bearings 47 and has a counterweight 48 to balance the weight of the valve and rod and the pressure of sand and water on the valve.

From one end of the outer lever 45 is suspended by slings 49 a canister 50. This is a vessel of cylindrical form with open top and with base closed by a cylindrical part of smaller diameter. The latter has a circular opening at the bottom surrounded by a discharge tube 51 for guiding the liquid discharged to waste at 52. Overflow from the cone leaves the gutter tank 39 by a pipe 53 and passes through a volute or banjo 54 and down a wide pipe 55 into the canister 50. A pipe 56 with a break or joint at 57 is fixed to the weir tank 40 and the centre of the banjo 54 to extend below the water level in the canister 50.

A hollow restrictor 58 of cylindrical form open at both ends is hung by a central suspension 59 from near one end of the inner lever 44. The lower end of the restrictor 58 fits the opening at the bottom of the canister with only sufficient clearance to permit free movement. Vanes 60 with tapered edges prevent rotation of the restrictor and guide it back into the opening if at any time it should rise far enough to leave the opening. Rectangular slots 61 are cut in the lower part of the restrictor 58, by which liquid entering the canister 50 may be discharged into the tube 51 through an opening varying with the relative heights of the canister 50 and restrictor 58.

A second canister 62 is similarly suspended from near the end of the outer lever 45 opposite to the end from which the canister 50 is suspended. A restrictor 63 similar to the restrictor 58 is suspended from the inner lever 44 to cooperate with the canister 62, which also receives a supply of liquid from the gutter tank 39 as described for the canister 50.

The quantity of liquid entering the gutter tank 39 is likely to be more than is required for the canisters 50 and 62. The liquid level in the tank 39 is therefore regulated by tapping some of the liquid off through a supplementary waste pipe 64 in which a hollow cylindrical valve 65 can slide. The valve 65 is suspended from a part of the structure 41 by a bar 66 provided with a series of holes for fixing it at a variable height. It will be seen that the head of liquid in the gutter tank 39 varies with the height at which the valve 65 is placed, and this in turn influences the flow through the pipe 53 to the canisters 50 and 62.

In operation a variation in the level of the sand accumulating in the cone varies the head of liquid in the tank 40 and, as in the case of Figure 1, causes the pre-amplifier tank 27 to move up or down, and with it the lever 44. Suppose the left hand end of the lever moves down due to an increased accumulation of sand, then the hollow restrictor 58 in the canister 50 also moves down, reducing the area of the slots 61 available for outflow from that canister. The liquid level in the canister rises. By the same action the area of the slots 61 associated with the canister 62 increases, the inflow to both canisters always being equal and the liquid level falls. Thereby the lever 45 being now out of balance, is moved counterclockwise to follow the lever 44, and the sand valve is opened a little more to increase the discharge of sand until equilibrium is restored in the new position of the levers, since the movement of the canisters readjusts the discharge areas of the slots 61, and thereby the liquid levels in the canisters are restored to normal.

Figure 2A:
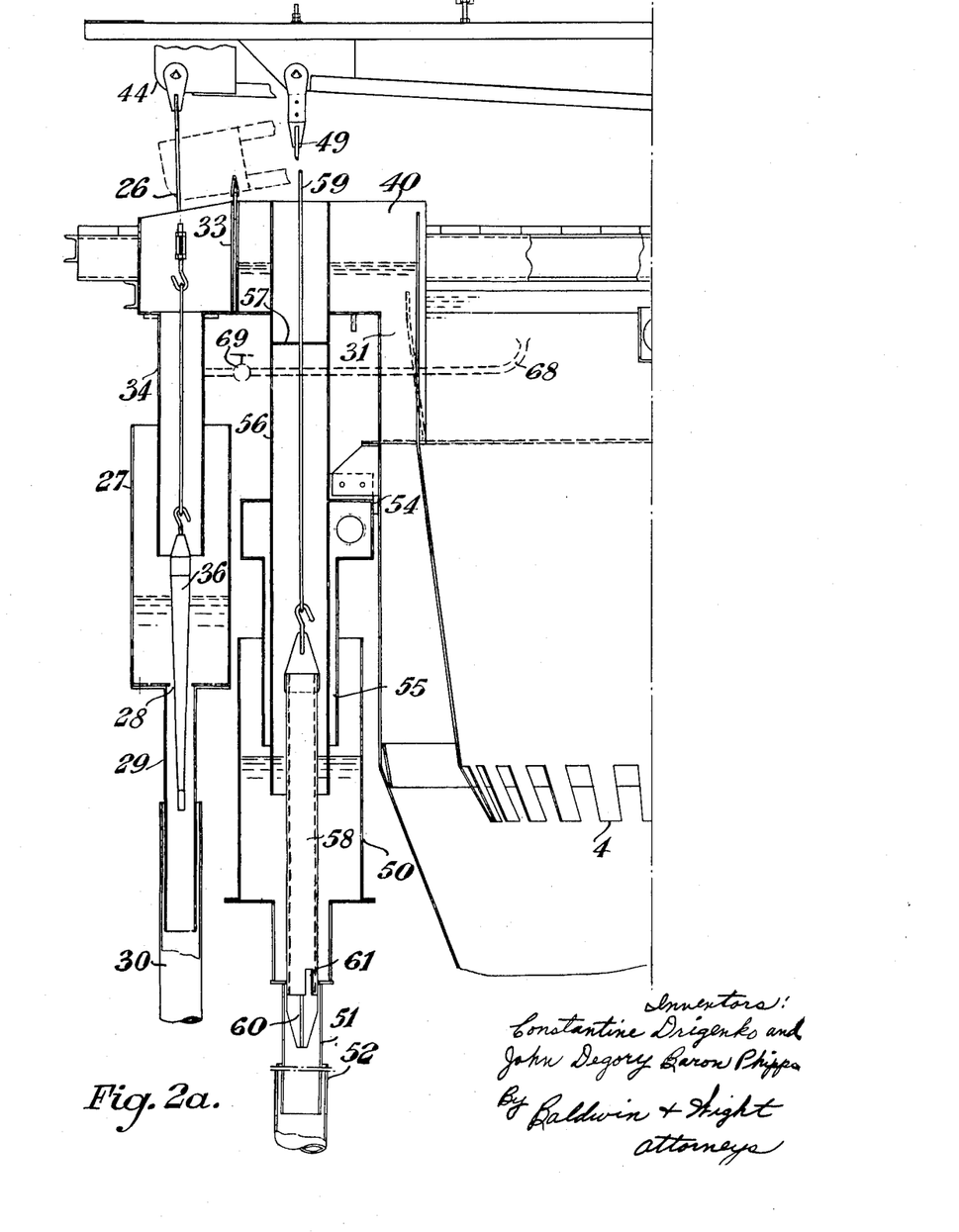
Figure 2B:
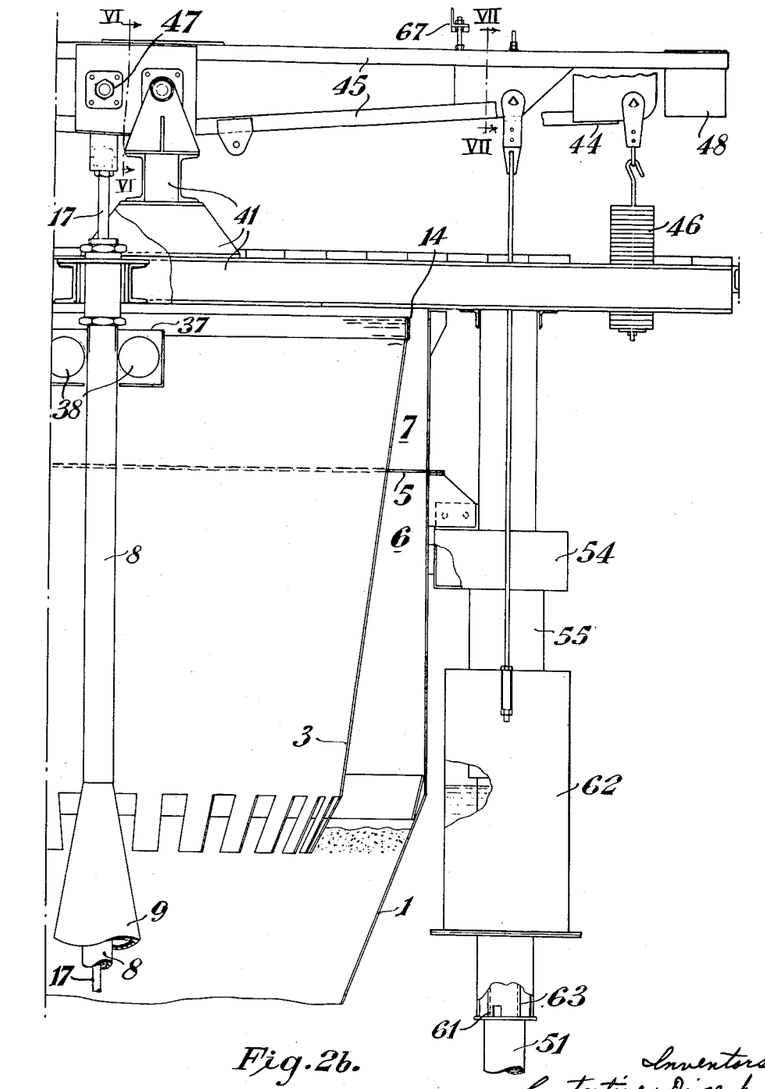
Figure 3:
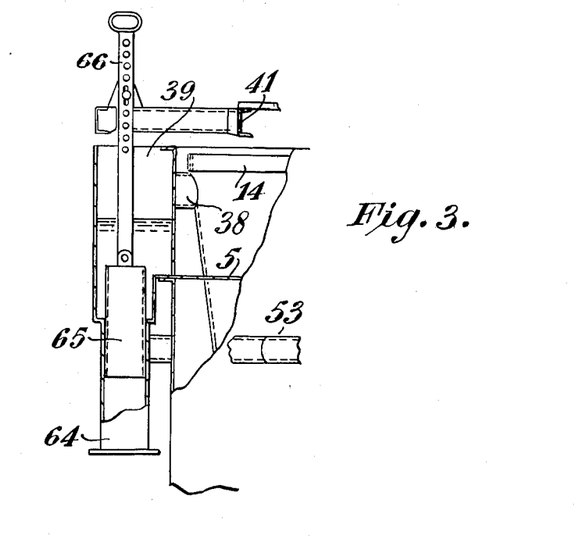
Figure 3 is a fragmentary sectional elevation of the same taken at right angles to Figure 2 to show the hand regulating valve.
Figure 4A:
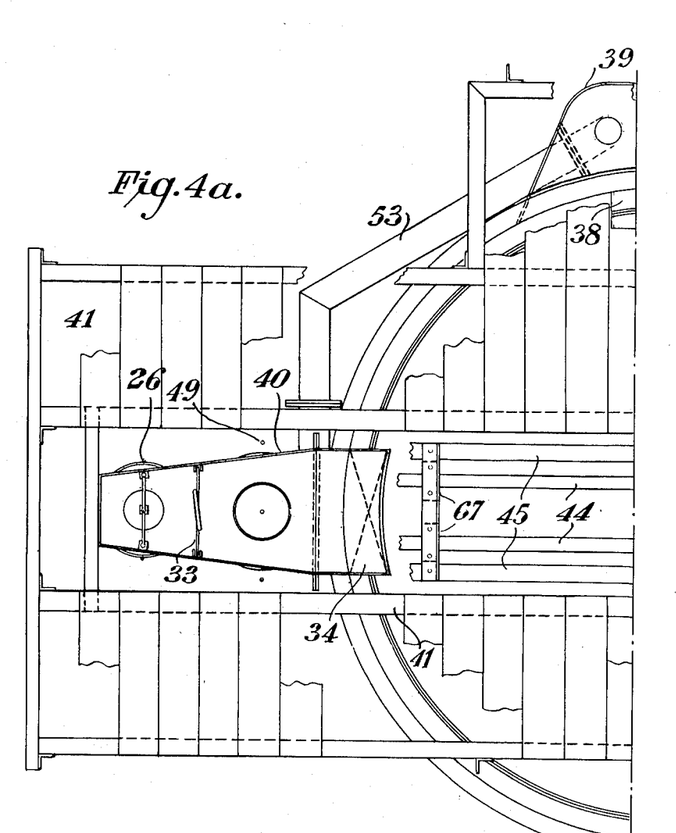
Figures 4a and 4b together constitute a plan of the cone partly broken away.
Figure 4B:
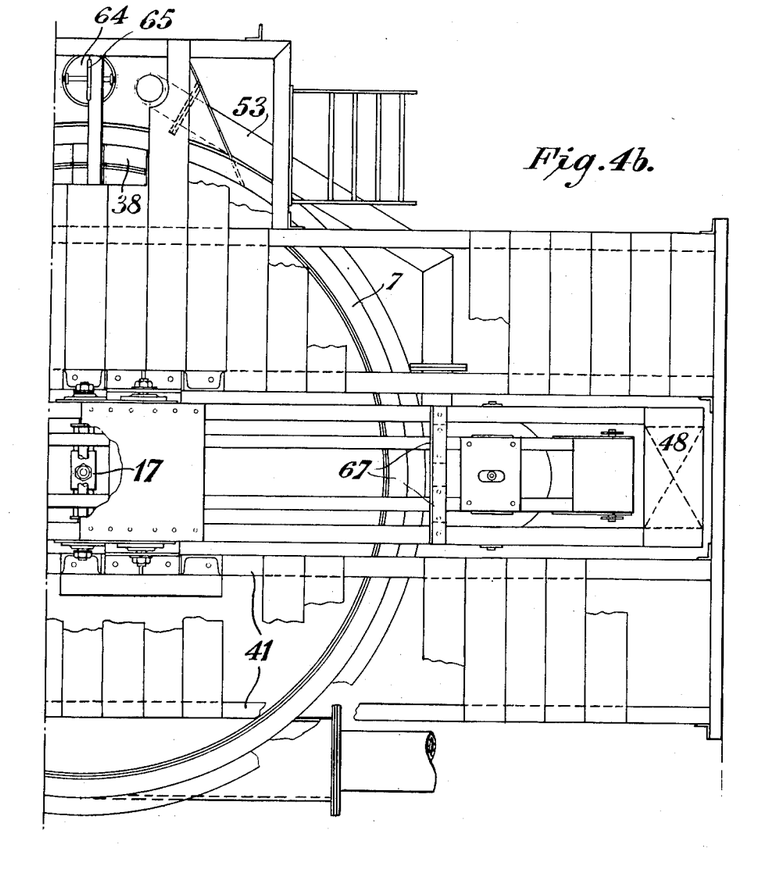

It is not necessary for the lever arms at which the two canisters act to be equal as shown in Figure 2. For instance the canister suspensions may be equidistant from the ball bearings 47 supporting the valve rod 17, or they may be asymmetrically placed with reference to both sets of bearings 43 and 47. If the lever arm of the canister 50 is called A and that of the canister 62 is called B, then the length of the slots 61 in the corresponding restrictors 58 should be in the proportion of A:B, while the width of the slots 61 should be in the proportion of B:A.

Figure 7:
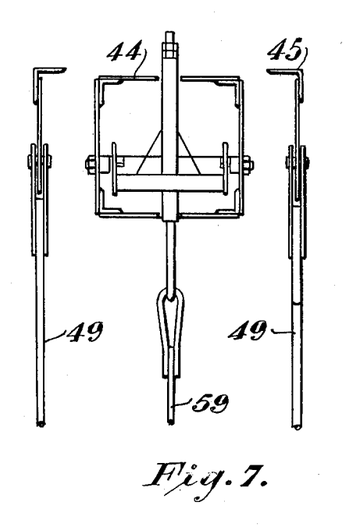
Figure 7 is similar to Figure 6 but on the line VII—VII.

The position of the mean water level in the canisters 50 and 62 has a certain bearing on the speed with which the operating effort of the lever 45 builds itself up. Since this level is governed by the effective area of the slots 61 (in mean position), the slings 59 are provided with an adjustable anchorage as shown in Figure 7.

The maximum closing effort exerted on the discharge valve may be increased if desired at the expense of the maximum opening effort by making the mean level in canister 50 higher than in canister 62, the balance weight 48 being adjusted to suit. More generally it may be stated that the maximum effort is decided by the size of canister, and the rate at which the effort builds itself up depends upon the rate of flow into the canister.

The restrictors 58 and 63 are made hollow with top and bottom open so that in the event of any undue rise of water level in either canister the excess will be discharged direct to waste instead of overflowing the top of the canister.

The inner lever 44 should be capable of swinging further than the outer lever 45 in both directions. The reason of this overtilt is that the operating effort on the outer lever 45 depends on the angular divergence between the levers. Thus without overtilt the discharge valve could not be maintained in either of its two extreme positions due to the operating effort collapsing to zero. In order that the two levers 44 and 45 may not move too far apart in their relative deflections, bridge pieces 67 are provided across the top of the lever 45 to limit the movement of the lever 44 in either direction.

If the pre-amplifier tank 27 has moved to its highest position, the restrictor 36 should theoretically just close the metering orifice 28, but to prevent jamming some clearance must be provided. To make up for the additional flow through the clearance area a small bleed may be provided by a pipe 68 from inside the cone through a valve 69 into the pipe 34.

Figure 8:
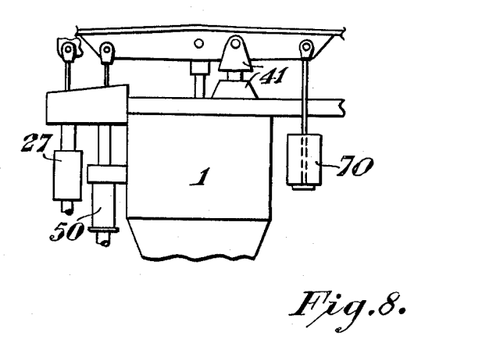
Figure 8 is a diagrammatic elevation of a modification.

It will be seen that with the arrangement described a rapid and powerful closing of the sand discharge valve is provided, which will overcome the tendency to "gushing." In some sizes of cone the closing effect may, in fact, be more powerful than necessary. If so, the canister 62 with its associated parts may be replaced by a counter-weight 70 as shown diagrammatically in Figure 8.

We claim:

1. In a sand cone having an inlet for a suspension of sand in water, a discharge valve for the coarser fraction at the bottom, an overflow for the water and fines and a passage for the suspension to flow through between the inlet and the overflow, with said passage being bounded at its lower side by the top surface of the sand accumulated in the cone whereby to create a back pressure at the inlet varying with the depth of the accumulated sand; mechanism for adjusting the degree of opening of the discharge valve in response to the back pressure at the inlet comprising a tank movable up and down according to the amount of liquid therein and having a metering orifice in its base, means including a conduit between said passage and said tank for supplying the tank with liquid at a rate dependent on the back pressure at the inlet, a stationary restrictor projecting into the metering orifice, said restrictor being tapered with the smaller diameter towards the lower end, and means connecting the tank to the discharge valve for moving said valve to increase the valve opening in response to a downward movement of the tank and decrease it with an upward movement thereof.

2. In a sand cone as defined in claim 1, the mechanism comprising a lever supported in an approximately horizontal position on a fulcrum, suspension means for the valve member on the lever near the fulcrum of the lever, and suspension means for the tank on the lever at a greater distance from the fulcrum than the first suspension means.

3. In a sand cone as defined in claim 1, the mechanism comprising a first lever supported in an approximately horizontal position on a fulcrum, suspension means for the tank on the lever, a second lever supported in an approximately horizontal position on a fulcrum, suspension means for the valve member on the second lever near the fulcrum thereof, and a hydraulic relay coupling between the said levers to cause the second lever to follow the movement of the first, said coupling utilising as its source of power at least a part of the liquid running to waste by the overflow.

4. In a sand cone as defined in claim 3, the hydraulic relay arrangement comprising two canisters, means suspending the canisters at opposite ends of the second lever, means for delivering operating liquid to the canisters, and means for causing the liquid level in each canister to increase or decrease when the corresponding end of the first lever is respectively below or above that of the second lever.

5. In a sand cone as defined in claim 4, each canister having an aperture in its base and a hollow restrictor which fits in the aperture and has slots of which the effective discharge area is varied by the up and down movement of the restrictor in the aperture.

6. In a sand cone as defined in claim 3, the hydraulic relay arrangement comprising a canister, means suspending the canister on the second lever near an end thereof, a counterweight near the opposite end thereof, supply means for the operating liquid to the canister, and means for causing the liquid level in the canister to increase or decrease when the corresponding end of the first lever is respectively below or above that of the second lever.

7. In a sand cone as defined in claim 1, the mechanism comprising a weir plate in the supply means to the tank which has an aperture of such shape that the flow of liquid through the aperture is in linear proportion to the back pressure at the cone inlet.

8. In a sand cone as defined in claim 1 wherein at the position of minimum flow there is still clearance between the metering orifice of the tank and the restrictor, and there is provided a bleed pipe from the interior of the cone to the tank and a regulating valve in the bleed pipe by which the flow of liquid therethrough may be regulated to an amount equal to that lost through the said clearance.

9. In a sand cone having an inlet for a suspension of sand in water, a discharge valve for the coarser fraction at the bottom, an overflow for the water and fines and a passage for the suspension to flow through between the inlet and the overflow, with said passage being bounded at its lower side by the top surface of the sand accumulated in the cone whereby to create a back pressure at the inlet varying with the depth of the accumulated sand; mechanism for adjusting the degree of opening of the discharge valve in response to the back pressure at the inlet comprising a tank movable up and down according to the amount of liquid therein and having a metering orifice in its base, means including a conduit between said passage and said tank for supplying the tank with liquid at a rate dependent on the back pressure at the inlet, a stationary restrictor projecting into the metering orifice, said restrictor being tapered with the smaller diameter towards the lower end, and a coupling in the form of lever gear between the tank and the discharge valve, the coupling direction being such that a lower position of the tank corresponds to a larger opening of the valve.

10. In a sand cone as set forth in claim 1, the mechanism comprising a weir plate in the supply means to the tank which has an aperture whose width at each level is proportional to the square root of the difference between that level and the water level in the cone without flow therein, whereby the flow of liquid through the aperture is in linear proportion to the back pressure at the cone inlet.

References Cited in the file of this patent
UNITED STATES PATENTS

| | | |
|---|---|---|
| 1,147,356 | Allen | July 20, 1915 |
| 1,841,444 | Hosking | Jan. 19, 1932 |
| 1,906,916 | Mitchell | May 2, 1933 |
| 2,564,963 | Drigenko | Aug. 21, 1951 |
| 2,598,409 | Meckenstock | May 27, 1952 |

FOREIGN PATENTS

| | | |
|---|---|---|
| 16,433 of 1910 | Great Britain | July 9, 1910 |